Jan. 14, 1930.  J. D. BROADFOOT  1,743,594
METHOD OF RECHARGING BATTERIES
Filed Dec. 28, 1923
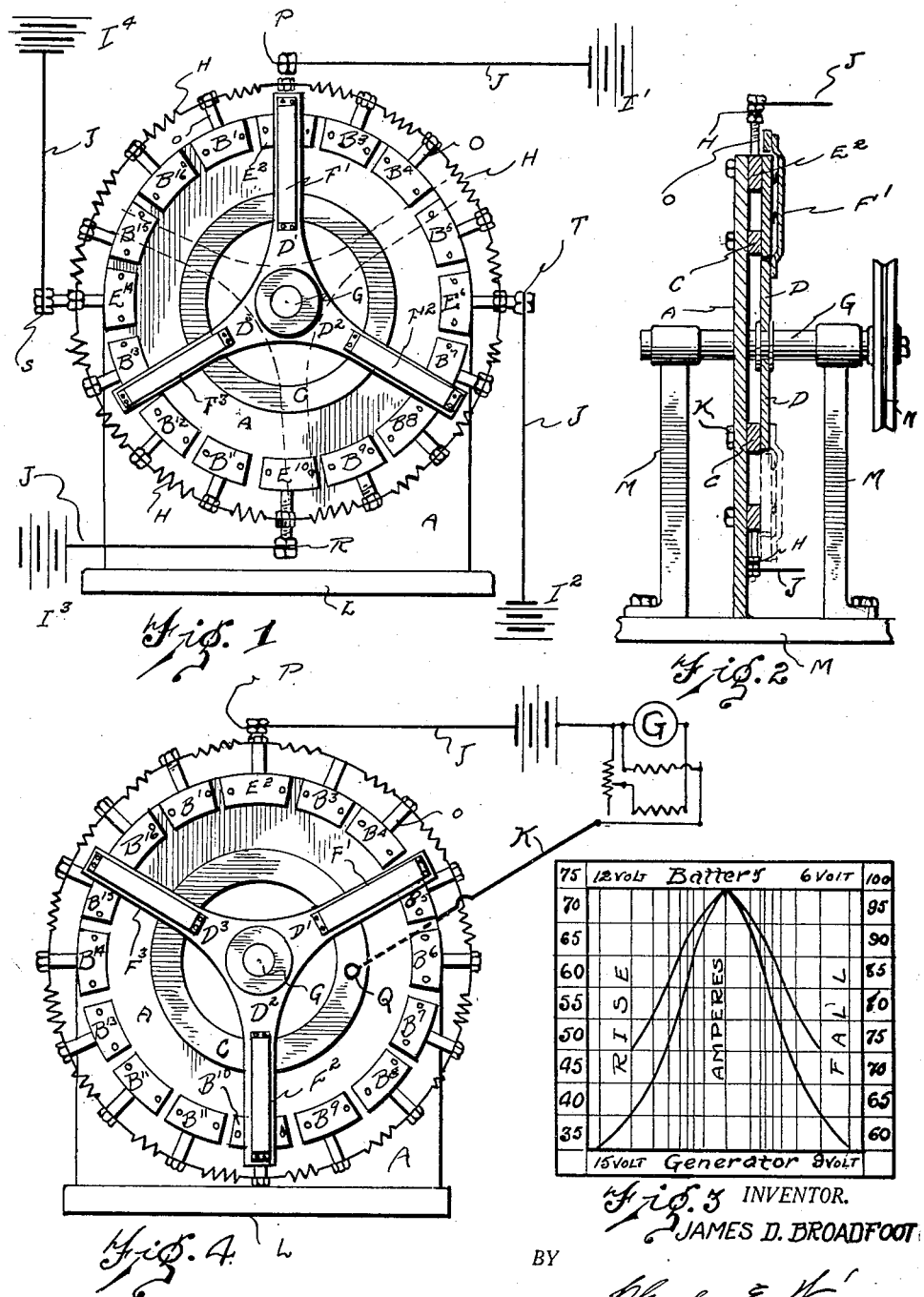
INVENTOR.
JAMES D. BROADFOOT
BY
ATTORNEY.

Patented Jan. 14, 1930

1,743,594

UNITED STATES PATENT OFFICE

JAMES D. BROADFOOT, OF CHATHAM, ONTARIO, CANADA, ASSIGNOR, BY MESNE ASSIGNMENTS, TO ECLIPSE ELECTRIC COMPANY, A CORPORATION OF DELAWARE

METHOD OF RECHARGING BATTERIES

Application filed December 28, 1923. Serial No. 683,103.

This invention relates to a method of recharging storage batteries, and the object is to provide a recharging method by means of which the said battery may be charged in a minimum period of time.

The method is particularly efficient and servicable in recharging storage batteries for the lighting and ignition circuits of automatic vehicles for the reason that, by my method the battery may be charged "while you wait."

Heretofore, the method commonly in use requires approximately thirty to forty hours to fully charge a battery, requiring the owner to rent a battery for use in the interval. This method obviates such inconvenience and lessens the cost of the operation. In the method at present in use, electric current of from six to nine amperes is allowed to flow into the battery and therefore a considerable period of time is required to recharge the same to condition to deliver a flow of 250 to 300 amperes to the starting motor for the required ampere hours. The present process is also faulty for the reason that, due to the low amperage of current the acid previously absorbed in the plates is not entirely driven out so that for instance the gravity test might give a reading of 12-50 whereas if all the acid were driven from the plates the reading would be 12-80 or 13-00 if fully charged. With a battery giving a specific gravity reading of 12-50 addition of acid would ordinarily be made to increase the gravity. By my arrangement the acid is practically entirely driven from the plates which results in the proper specific gravity reading.

A further object of the invention is to recharge the battery in a manner to soften the plates and to clear the same of sulphate so that the entire area of the plate is in condition for receiving a charge and, as is hereinafter shown, a battery, if in good condition, can be recharged and give the correct specific gravity reading according to the actual condition of the acid in from one-half to three-fourths of an hour without injury to the battery and instead of voltage readings for charging of the storage battery as in the process now in use I use a temperature and gravity test and the batteries are left in circuit until the acid ceases to rise in specific gravity taking care at all times that the heat thereof does not increase above 115 degrees F. These objects and the various novel features of the invention are hereinafter more fully described and claimed, and the preferred form of instrument and circuit for use in charging a battery by my process is shown in the accompanying drawings in which—

Fig. 1 is a side elevation of a rheostat adapted for use in recharging a battery by my method.

Fig. 2 is a side elevation thereof partly in section.

Fig. 3 is a diagram showing the rise and fall in amperage of current flowing to the battery.

Fig. 4 is an elevation showing the rheostat, the generator and the circuit for charging a battery.

The instrument utilized in the circuit forms the subject matter of another application for Letters Patent and a brief description is here given to enable the operation to be fully understood. The instrument, which is of the nature of a rheostat, consists of a plate or slab A of insulating material which has a central aperture through which passes the shaft on which is provided a pulley N. The plate A is stationary being supported at its lower end on the base L and on this base are secured the standards M, M for supporting the shaft. On the plate A is a series of spaced segments circularly arranged, there being a series of elements $B^1$, $B^3$, $B^4$, $B^5$, $B^7$, $B^8$, $B^{11}$, $B^{12}$, $B^{13}$, $B^{15}$ and $B^{16}$, and similar segments $E^2$, $E^6$, $E^{10}$ and $E^{14}$ similar in form and equidistantly spaced between the first named segments. Each of these segments has posts extending radially outward therefrom and a resistance coil H is secured in electrical contact with these posts which engage the same in equidistantly spaced relation and a battery to be charged may be connected to the post of each segment $E^2$, $E^6$, $E^{10}$ or $E^{14}$. What I have termed a collector ring C is provided to which the circuit wire K, from a generator or other source of current supply, is attached at Q. On the shaft is a spider consisting of the arms $D^1$, $D^2$ and $D^3$ which carry respectively the brushes $F^1$, $F^2$ and $F^3$ which are of a length to engage a segment and the ring simultaneously. The pulley N may be connected with the generator or other convenient source of power and rotated at the desired speed. The spider and the brushes thereon are rotated in clockwise direction. Let it be considered that only the battery $I^1$ is to be charged and that the batteries $I^2$, $I^3$ and $I^4$ are not connected with the device. With the brush $F^1$ in the position shown in the drawing the full amperage of current will flow to the battery and, as the brush passes to contact with the segment $B^3$ less amperage of current will flow due to the resistance that is cut into the circuit. On contact of the brush $F^1$ with the segment $B^4$ a still further decrease in amperage or current flow will be occasioned. In the meantime the brush $F^2$ is being raised toward the segment $E^2$ directly connected with the battery $I^1$ and when it is at a point that less resistance exists between the brush $F^3$ and the post to which the battery is connected, the amperage of current flow will increase in successive steps to the full amperage at the time the brush $F^3$ contacts the segment $E^2$. By this arrangement successive surges in the amperage of current flow between a high and a low amperage is caused and in the construction here shown is of practically equal extent which is the preferable condition. It is to be understood, however, that a construction may be employed in which the period of high amperage may be less or greater than the period of low amperage. The rapidity of change in amperage depends upon the rapidity of revolution of the spider carrying the brush elements and a satisfactory speed for all general purposes I have found to be about thirty to forty revolutions per minute in the construction here shown.

Also shown in Fig. 1 batteries $I^2$, $I^3$ and $I^4$ may be connected respectively at T, R and S with the respective segments $E^6$, $E^{10}$ and $E^{14}$ which are equidistantly spaced between the segments designated by the letter B. With two or more batteries connected to equidistantly spaced segments, each of the batteries receives an exactly equal amount of current and current flows to each of the batteries in surges as with the single battery above more fully described. While I have described and shown a specific construction of instrument for producing a surging in the amperage of current flow, the invention is not confined to such particularities of construction as the process may be performed by other instrumentalities.

By experimentation I have found that by causing flow of high amperage of current and alternate periods of low amperage, the acid is driven from the plates with great rapidity causing the same to rise in level in the cell and in specific gravity whereby a gravity test will give the actual condition of the battery as to specific gravity and amount of acid, and that under this condition a correct specific gravity reading may be taken. I have further discovered that, by this surging of current between high and low amperage, the plates are softened and are cleared of sulphate whereby the entire surface is exposed to action of the acid. It is also to be understood that different batteries will stand a different high amperage of current flow and this is determined by the capacity of the battery shank connected in the circuit. In the performance of the process the battery should remain in the circuit only until the acid ceases to rise in level or to increase in specific gravity then is immediately cut off from the circuit. Otherwise, the temperature thereof will rise beyond a safe point but up to the time the acid ceases to rise in level the battery will not overheat. I therefore am able to test the battery not by voltage test ordinarily in use but by specific gravity and temperature to determine when the same is properly charged.

In Fig. 3 I have shown a diagram indicating the rise and fall in amperage of current flowing to a six or twelve volt battery on the right and left sides of the diagram respectively. The lower curved line running from 60 to 100 on the right side of the diagram indicates the rise and fall in amperage when a single battery is being charged while the upper curved line indicates the rise and fall when two or more batteries are being charged. Likewise on the left of the diagram the respective lines indicate the rise and fall in amperage in the charging of a single or of several batteries simultaneously. A further advantage in this method of charging a battery besides the short period of time for recharging is that sediment which may gather in the bottom of the battery jar is brought to the top which is caused by the heavy oxygen bubbles resulting from the high amperage and this condition indicates a defect in the positive plates indicating that the same are in bad condition requiring cleaning or repair. Therefore when the instrument is first attached to the battery the condition of the battery may be indicated without taking the same apart and this enables the work to be done with a battery in a motor vehicle for instance without removal therefrom and if a bad condition is not indicated in the manner stated the recharging may be proceeded with as described.

The principal difference between the process ordinarily in use for charging a battery and my improved process is that instead of a current flow of low amperage the current is made to surge in waves of a very high amperage and a much lower amperage and the time of recharging is thus shortened. The battery may be fully charged in the short period for the reason that the plates are entirely cleared of sulphate exposing the entire area to action as heretofore stated.

Having thus fully described my improved process and the convenient apparatus by which the process may be performed, what I claim is—

1. The method of recharging a storage battery which consists in causing current to flow thereinto in successive surges ranging from low to high amperage of a frequency not materially less than eighty surges per minute, the period of maximum amperage being approximately one-sixth of the cycle period.

2. The method of recharging storage batteries which consists in causing current to flow thereinto in successive surges ranging from high to low amperage of a frequency not materially less than eighty surges per minute, the surges being characterized by a step by step change in current value increasing toward and decreasing from the point of high amperage at which the battery is short-circuited for a period of approximately one-sixth of the cycle period.

In testimony whereof, I sign this specification.

JAMES D. BROADFOOT.